(12) United States Patent
Zhao et al.

(10) Patent No.: US 10,472,776 B2
(45) Date of Patent: Nov. 12, 2019

(54) VEHICLE POWER COMPARTMENT AND ENGINEERING VEHICLE PROVIDED WITH SAME

(71) Applicant: XCMG CONSTRUCTION MACHINERY CO., LTD., Xuzhou, Jiangsu (CN)

(72) Inventors: Bin Zhao, Xuzhou (CN); Yanbo Geng, Xuzhou (CN); Huan Wang, Xuzhou (CN)

(73) Assignee: XCMG Construction Machinery Co., Ltd., Xuzhou (CN)

( * ) Notice: Subject to any disclaimer, the term of this patent is extended or adjusted under 35 U.S.C. 154(b) by 0 days.

(21) Appl. No.: 16/067,280

(22) PCT Filed: May 26, 2017

(86) PCT No.: PCT/CN2017/086121
§ 371 (c)(1),
(2) Date: Jun. 29, 2018

(87) PCT Pub. No.: WO2017/215433
PCT Pub. Date: Dec. 21, 2017

(65) Prior Publication Data
US 2019/0017232 A1    Jan. 17, 2019

(30) Foreign Application Priority Data
Jan. 20, 2017 (CN) .......................... 2017 1 0040165

(51) Int. Cl.
*E01C 19/26* (2006.01)
*B60K 11/04* (2006.01)
(Continued)

(52) U.S. Cl.
CPC .............. *E01C 19/26* (2013.01); *B60K 11/04* (2013.01); *B60K 11/08* (2013.01); *B62D 25/082* (2013.01);
(Continued)

(58) Field of Classification Search
CPC ............................................. B60K 11/04–085
See application file for complete search history.

(56) References Cited

U.S. PATENT DOCUMENTS 3,319,732 A * 5/1967 Soeteber .................. F01P 11/10
                                                       180/68.1
4,081,050 A * 3/1978 Hennessey ............. B60K 11/04
                                                       180/233
(Continued)

FOREIGN PATENT DOCUMENTS

CN          2512808          9/2002
CN        101253063          8/2008
(Continued)

OTHER PUBLICATIONS

Translation of International Search Report for PCT/CN2017/086121 dated Oct. 26, 2017, 2 pages.

*Primary Examiner* — Erez Gurari
(74) *Attorney, Agent, or Firm* — Myers Bigel, P.A.

(57) ABSTRACT

A vehicle power cabin includes: a chamber; a radiator mounted in the chamber; a fan for driving air to flow through the radiator; and a motor for driving the fan. The chamber includes a first air inlet for introducing air exchanging heat with the radiator and an air outlet for outputting air exchanged heat with the radiator. The first air inlet, the radiator and the fan are sequentially arranged in the longitudinal direction of the vehicle. The first air inlet and the radiator are spacedly disposed in the longitudinal direction. The first air inlet is disposed at the bottom of the chamber. The first air inlet, the radiator and the cooling fan are
(Continued)

sequentially arranged in the longitudinal direction of the vehicle, so that the air can smoothly flow to the radiator, thereby effectively avoiding vortex produced in the process of air flow, so as to reduce the noise.

17 Claims, 6 Drawing Sheets

(51) Int. Cl.
- *B60K 11/08* (2006.01)
- *B62D 25/08* (2006.01)
- *E02F 9/08* (2006.01)
- *B62D 49/00* (2006.01)
- *G10K 11/16* (2006.01)

(52) U.S. Cl.
CPC ............ *B62D 49/00* (2013.01); *E02F 9/0866* (2013.01); *E02F 9/0891* (2013.01); *G10K 11/161* (2013.01); *B60Y 2200/411* (2013.01); *E05Y 2900/536* (2013.01)

(56) References Cited

U.S. PATENT DOCUMENTS

| | | | | |
|---|---|---|---|---|
| 4,114,714 A * | 9/1978 | Fachbach | ............... | B60K 11/00 180/68.1 |
| 4,771,844 A * | 9/1988 | Bassett | ................. | B60K 11/08 180/68.1 |
| 4,940,100 A * | 7/1990 | Ueda | ...................... | B60K 11/08 123/41.31 |
| 5,036,931 A * | 8/1991 | Iritani | ................... | B60K 11/08 180/68.1 |
| 5,042,604 A * | 8/1991 | Tone | ...................... | B60K 11/04 180/68.4 |
| 5,113,819 A * | 5/1992 | Murakawa | ............ | B60K 11/02 123/198 E |
| 5,209,314 A * | 5/1993 | Nishiyama | ............ | B60K 11/04 180/68.6 |
| 5,625,172 A * | 4/1997 | Blichmann | ............ | F02B 77/13 181/204 |
| 5,660,244 A * | 8/1997 | Matsuda | ................ | B60K 11/04 180/68.1 |
| 5,791,301 A * | 8/1998 | Watanabe | ............. | B60K 11/06 123/41.31 |
| 6,009,705 A * | 1/2000 | Arnott | ...................... | F01N 1/02 123/184.57 |
| 6,302,228 B1 * | 10/2001 | Cottereau | ............. | B60K 11/08 180/68.1 |
| 6,408,969 B1 * | 6/2002 | Lobert | ................... | B60K 11/08 165/41 |
| 8,590,651 B2 * | 11/2013 | Shigematsu | ........... | B60K 13/02 180/68.1 |
| 8,740,288 B2 * | 6/2014 | Kamimae | .......... | B60H 1/00378 296/190.09 |
| 8,770,166 B2 * | 7/2014 | Tucker | ................ | F02M 35/108 123/184.56 |
| 2003/0029581 A1 * | 2/2003 | Vide | .................... | B60K 11/085 160/201 |
| 2006/0144350 A1 * | 7/2006 | Nakashima | ........... | B60K 11/08 123/41.01 |
| 2006/0254838 A1 * | 11/2006 | Ino | ...................... | B60K 11/085 180/68.1 |
| 2008/0169142 A1 * | 7/2008 | Kinoshita | .............. | B60K 11/08 180/68.1 |
| 2010/0089674 A1 * | 4/2010 | Oka | ...................... | B60K 11/04 180/68.1 |
| 2011/0297468 A1 * | 12/2011 | Coel | .................... | B60K 11/085 180/68.1 |
| 2012/0024611 A1 * | 2/2012 | Ajisaka | ................. | B60K 11/08 180/68.1 |
| 2013/0048396 A1 * | 2/2013 | Neilson | ................. | B60K 11/04 180/68.1 |
| 2013/0059519 A1 * | 3/2013 | Tajima | ................... | B60K 11/04 454/152 |
| 2013/0081888 A1 * | 4/2013 | Charnesky | ............. | B60K 11/04 180/68.3 |
| 2013/0092463 A1 * | 4/2013 | Hori | ..................... | B60K 11/085 180/68.1 |
| 2013/0095740 A1 * | 4/2013 | Hori | ..................... | B60K 11/085 454/152 |
| 2013/0268164 A1 * | 10/2013 | Sugiyama | ............ | B60K 11/085 701/49 |
| 2014/0020968 A1 * | 1/2014 | Ikeya | ....................... | B60K 1/04 180/65.31 |
| 2014/0138077 A1 * | 5/2014 | Ajisaka | .................. | B60K 11/04 165/287 |
| 2014/0251241 A1 * | 9/2014 | Tajima | ................... | B60K 11/04 123/41.56 |
| 2015/0017901 A1 * | 1/2015 | Pfohl | ...................... | F01P 5/043 454/141 |
| 2015/0211210 A1 * | 7/2015 | Miyachi | ................ | E02F 9/0866 180/68.1 |
| 2017/0087976 A1 * | 3/2017 | Tsuchihashi | ........... | B60K 11/04 |
| 2017/0362796 A1 * | 12/2017 | Nakagawa | ............ | E02F 9/0866 |
| 2017/0362797 A1 * | 12/2017 | Nakagawa | ............ | B60K 11/04 |
| 2018/0056776 A1 * | 3/2018 | Oshikawa | .............. | E02F 3/7604 |
| 2018/0065472 A1 * | 3/2018 | Ohno | .................... | B60K 11/06 |
| 2018/0238020 A1 * | 8/2018 | Hirasawa | .............. | B60K 11/04 |
| 2018/0266076 A1 * | 9/2018 | Sakron | .................. | E02F 9/0866 |
| 2018/0304936 A1 * | 10/2018 | Watabe | .................. | B60K 11/04 |
| 2019/0009647 A1 * | 1/2019 | Huenemoerder | ...... | B60H 1/321 |
| 2019/0017232 A1 * | 1/2019 | Zhao | ..................... | B60K 11/08 |

FOREIGN PATENT DOCUMENTS

| | | |
|---|---|---|
| CN | 102619156 | 8/2012 |
| CN | 204279200 | 4/2015 |
| CN | 205768625 | 12/2016 |
| JP | S554448 | 1/1980 |

* cited by examiner

VEHICLE POWER COMPARTMENT AND ENGINEERING VEHICLE PROVIDED WITH SAME

RELATED APPLICATIONS

The present application is a 35 U.S.C. § 371 national phase application of PCT International Application No. PCT/CN2017/086121, filed May 26, 2017, which claims priority to Chinese Patent Application No. 201710040165.5, filed Jan. 20, 2017, the disclosures of which are hereby incorporated herein by reference in their entireties.

FIELD OF THE INVENTION

The present disclosure relates to the field of construction machinery, and specifically relates to A vehicle power cabin and a construction vehicle.

BACKGROUND OF THE INVENTION

Noise is the third major pollution source which only follows water and air pollution. Among various noise sources, building construction noise is in the leading position, while building construction noise is mainly produced by substantial application of construction machinery. The road roller which is an important tool in construction, mainly functions to compact roadbed and road pavement material mixture, and attains very wide application in such aspects as railway laying, urban expansion, roadbed and road compaction, port construction, hydroelectric power generation and resource exploitation. With the recognition of green concept of environmental protection and social progress, the laws and regulations related to noise restriction have become increasingly stringent and perfected. The noise level has become an important index that affects the product sales of roller products and measures the product quality thereof.

The power cabin structure is an important member that affects the functional effects such as thermal balance, fine appearance, sound insulation and noise reduction of a complete vehicle, which is one of the key tasks in the design of construction machinery products.

FIG. 1 shows a schematic view of the structure of the power cabin of the road roller in the related art; FIG. 2 shows a schematic view of the structure at the air inlet of the power cabin of the road roller in the related art; FIG. 3 shows a schematic view of the internal structure of the power cabin of the road roller in the related art.

In combination with the illustrations of FIGS. 1-3, the road roller of the related art comprises a frame 3, an engine 8 mounted on the frame 3, an engine hood 2 covered on the engine 8 and a cab 1 located in front of the engine 8.

The road roller further comprises a radiator 5 and a cooling fan for leading the air to the radiator 5, and the radiator 5, the cooling fan, and the engine 8 are sequentially arranged in a longitudinal direction of the road roller. Among them, the cooling fan is driven by the engine. A first air inlet 6 and a second air inlet 17 along a vertical direction are provided at both sides of the radiator 5. An air outlet 4 is provided in the rear of the engine hood 2. The air introduced by the first air inlet 6 and the second air inlet 7 after exchanging heat with the radiator, flows to the air outlet 4 via both sides of the engine 8.

In the related art, the first air inlet 6 and the second air inlet 7 are substantially flush with the radiator 5 in a longitudinal direction of the vehicle, and the air flowing to the radiator 5 easily produces vortex due to steering, resulting in increased noises. Further, the noise produced by the engine may also be radiated from the first air inlet, the second air inlet and the air outlet 4, so that the road roller of the related art is subject to serious noise pollution.

SUMMARY OF THE INVENTION

The present disclosure provides a vehicle power cabin, the vehicle power cabin comprising: a chamber; a radiator mounted in the chamber; a fan for driving air to flow through the radiator; and a motor for driving the fan; wherein, the chamber comprising a first air inlet for introducing air exchanging heat with the radiator and an air outlet for outputting air exchanged heat with the radiator; the first air inlet, the radiator and the fan being sequentially arranged in the longitudinal direction of the vehicle, the first air inlet and the radiator being spacedly disposed in the longitudinal direction, the first air inlet is disposed at the bottom of the chamber.

Alternatively, in the vehicle power cabin, the air outlet and the first air inlet (9) are arranged along the longitudinal direction.

Alternatively, in the aforementioned vehicle power cabin, the first air inlet is disposed at the bottom of the chamber.

Alternatively, in the aforementioned vehicle power cabin, the vehicle power cabin further comprising a first muffler mounted at the first air inlet.

Alternatively, in the aforementioned vehicle power cabin, the first muffler comprising a silencing louver.

Alternatively, in the aforementioned vehicle power cabin, wherein the chamber comprising a second air inlet provided on a side of the chamber for introducing air exchanging heat with the radiator.

Alternatively, in the aforementioned vehicle power cabin, the vehicle power cabin further comprising a second muffler mounted at the second air inlet.

Alternatively, in the aforementioned vehicle power cabin, wherein the second muffler comprising a Helmholtz resonator.

Alternatively, in the aforementioned vehicle power cabin, the vehicle power cabin further comprising a third muffler mounted in the chamber, for reducing noise produced by air flowing from the first air inlet to the air outlet.

Alternatively, in the aforementioned vehicle power cabin, wherein the third muffler comprising quarter wave resonator.

Alternatively, in the aforementioned vehicle power cabin, the vehicle power cabin further comprising a fourth muffler mounted at the air outlet.

Alternatively, in the aforementioned vehicle power cabin, wherein the fourth muffler comprising a housing on which an acoustic hole is provided and an acoustic material provided within the housing.

Alternatively, in the aforementioned vehicle power cabin, the vehicle power cabin further comprising a flow guiding member for guiding the air exchanged heat with the radiator to the air outlet.

Alternatively, in the aforementioned vehicle power cabin, wherein the flow guiding member (13) comprising a fifth muffler.

Alternatively, in the aforementioned vehicle power cabin, the vehicle power cabin further comprising a frame for carrying the motor, the fifth muffler comprising a muffler cavity, the muffler cavity comprising a cavity enclosed by the frame and a perforated plate obliquely disposed at a corner of the frame, an acoustic material being provided at one side of the perforated plate facing the cavity.

Alternatively, in the aforementioned vehicle power cabin, the vehicle power cabin comprises a first baffle for isolating a cab from the chamber for accommodating the motor.

Alternatively, in the aforementioned vehicle power cabin, the first baffle presents an inverted-凸 shape, and an acoustic material is attached to one face of the first baffle facing the chamber.

Alternatively, in the aforementioned vehicle power cabin, wherein the chamber is enclosed.

Alternatively, in the aforementioned vehicle power cabin, wherein the inner wall of the chamber is wholly or locally provided with an acoustic material.

The present disclosure provides a construction vehicle, the construction vehicle comprising the aforementioned vehicle power cabin.

The advantageous effects of the present disclosure are as follows:

By applying the technical solution of the present application, the first air inlet, the radiator and the cooling fan are sequentially arranged in the longitudinal direction of the vehicle, and the first air inlet and the radiator are spacedly disposed in a longitudinal direction, so that the air can smoothly flow to the radiator, thereby effectively avoiding vortex produced in the process of air flow, so as to reduce the noise.

BRIEF DESCRIPTION OF THE ACCOMPANYING DRAWINGS

The aforementioned as well as other objects, features and advantages of the present invention will be more clear, by means of the following descriptions of the embodiments of the present disclosure with reference to the drawings, in which drawings.

Figure 1:
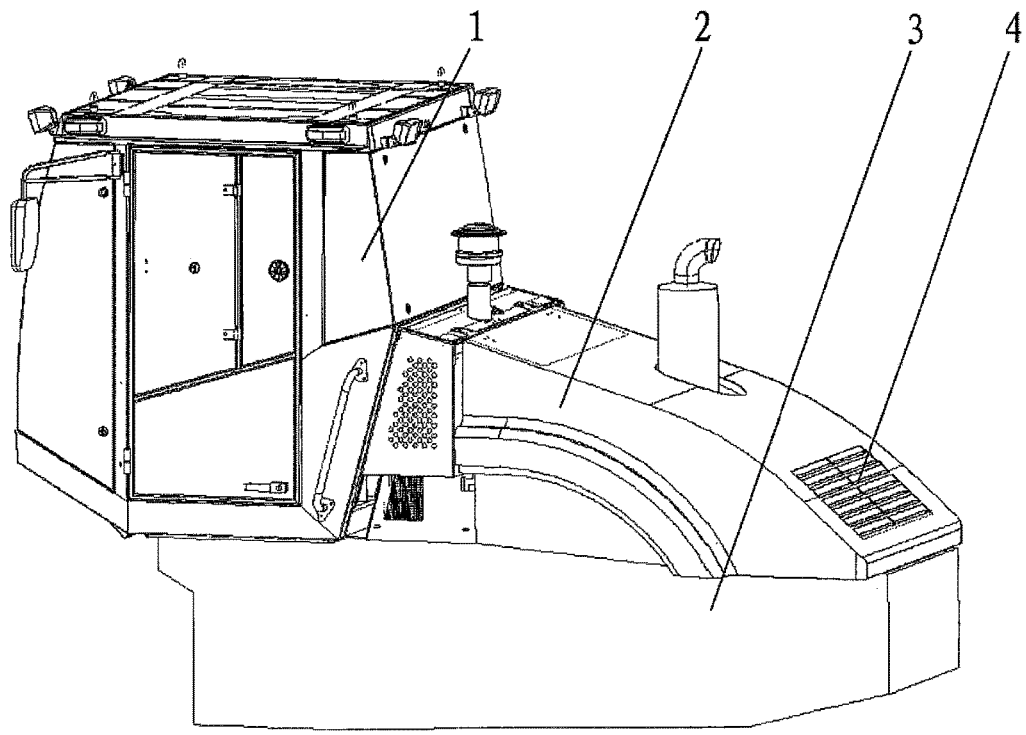
FIG. 1 shows a schematic view of the structure of the construction vehicle in the related art.
Figure 2:
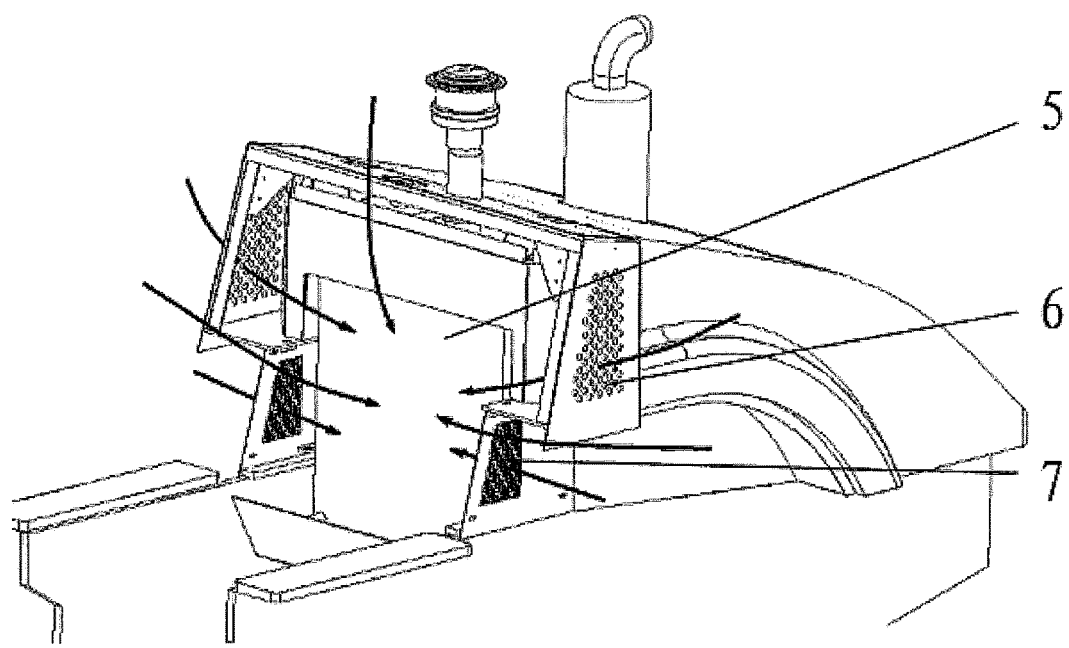
FIG. 2 shows a schematic view of the structure at the air inlet of the power cabin of the vehicle in the related art.
Figure 3:
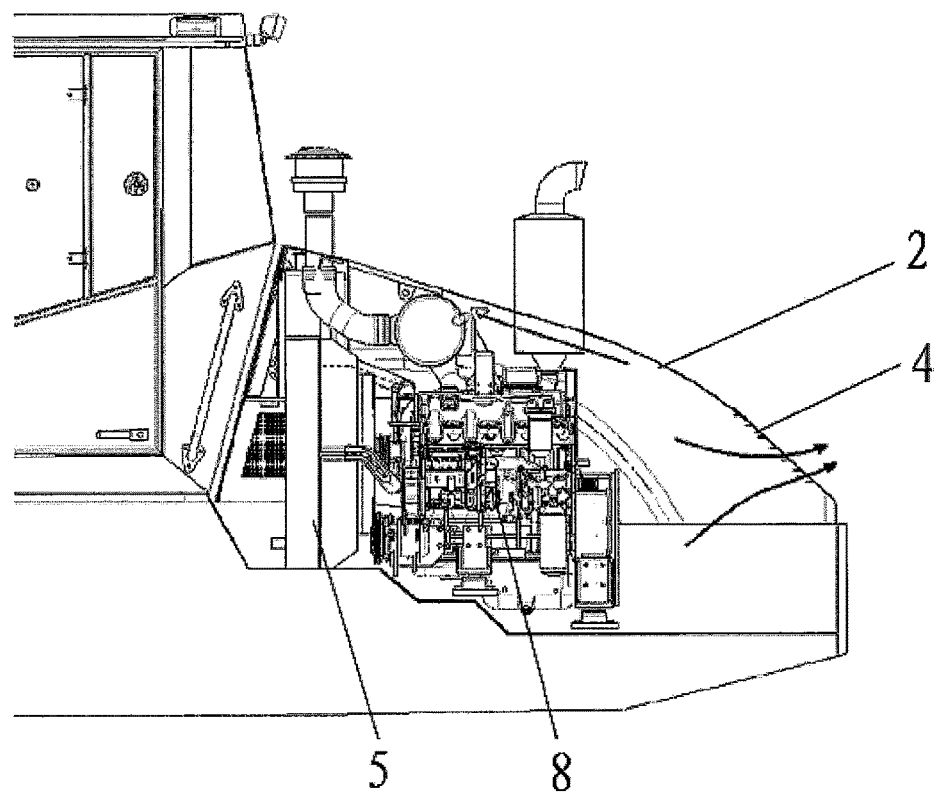
FIG. 3 shows a schematic view of the internal structure of the power cabin of the vehicle in the related art.

In the drawings: 1. cab; 2. engine hood; 3. air outlet; 4. frame; 5. first baffle; 6. second air inlet; 7. second muffler; 8. radiator; 9. first air inlet; 10. third muffler; 11. grille; 12. fourth muffler; 121. housing; 122. partition; 123. hole; 13. flow guiding member; 14. motor; 15. fan; 16. second baffle; 17. third baffle; 18. perforated plate; 19. acoustic material; 20. Cavity.

DETAILED DESCRIPTION OF THE PREFERRED EMBODIMENTS

The present disclosure is described as follows on the basis of the embodiments, but the present disclosure is not only limited to such embodiments. Several specific detailed portions are described in detail in the following detailed descriptions of the present disclosure. For a person skilled in the art, the present disclosure may also be fully understood without descriptions of such detailed portions. In order to avoid confusion of the essence of the present disclosure, detailed narrations are not made to the commonly known methods, processes, flow procedures, and elements.

Figure 4:
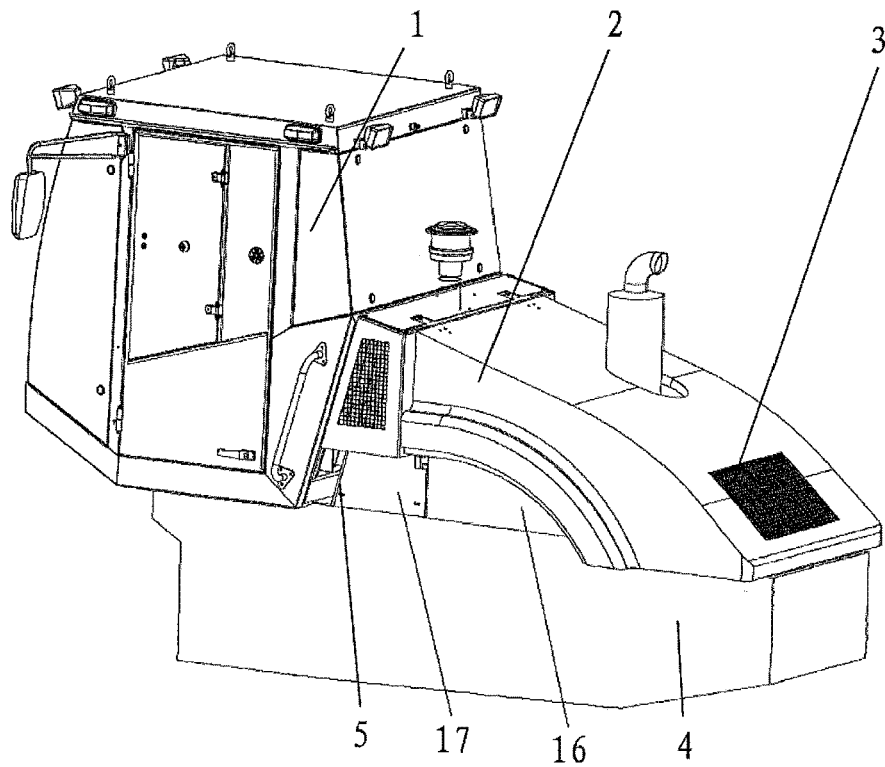
FIG. 4 shows a schematic view of the structure of the construction vehicle in the embodiments of the present disclosure.
Figure 5:
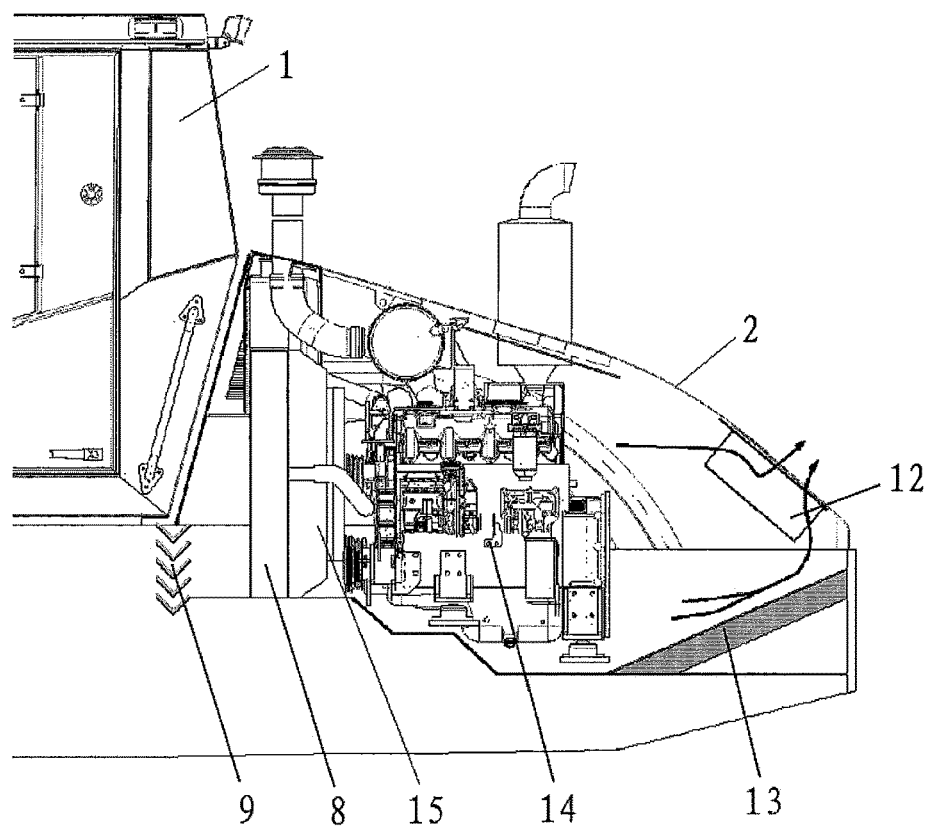
FIG. 5 shows a schematic view of the layout of various members of the vehicle power cabin in the embodiments of the present disclosure.
Figure 6:
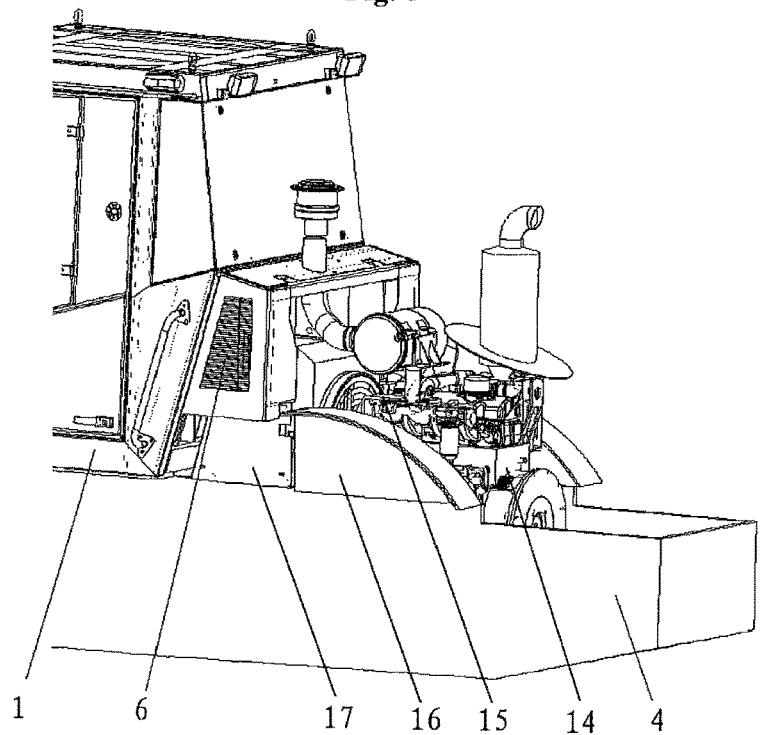
FIG. 6 shows a schematic view of the internal structure of the vehicle power cabin in the embodiments of the present disclosure.

FIG. 4 shows a schematic view of the structure of the construction vehicle in the present embodiments; FIG. 5 shows a layout view of various members of the vehicle power cabin in the present embodiment; FIG. 6 shows a schematic view of the internal structure of the vehicle power cabin in the present embodiment.

In combination with the illustrations of FIGS. 4-6, the construction vehicle of the present embodiment comprises a frame 4, a motor 14 mounted on the frame 4, and a cab 1 disposed in front of the motor 14.

The vehicle power cabin comprises a chamber; a radiator 8 mounted in the chamber; a fan 15 for driving air to flow through the radiator 8 and the motor 14 for driving the fan 15.

The motor 14 is disposed within the chamber for placing the motor 14. The radiator 8 and the fan 15 are also mounted in the chamber. The fan 15 is driven by the motor 14.

The chamber comprises an air inlet for introducing air exchanging heat with the radiator 8 and an air outlet 3 for outputting air exchanged heat with the radiator 8. The air inlet comprises a first air inlet 9 and a second inlet 6. The first air inlet 9, the radiator 8 and the fan 15 are sequentially arranged in the longitudinal direction of a vehicle. The first air inlet 9 and the radiator 8 are spacedly disposed in the longitudinal direction, so that the air can smoothly flow to the radiator, thereby effectively avoiding vortex produced in the process of air flow, so as to reduce the noise.

Further, the air can smoothly flow to the radiator 8 to ensure that there is sufficient air in heat exchange with the radiator 8, and the radiation efficiency of the radiator 8 is improved.

In the present embodiment, the vehicle power cabin further comprises a first baffle 5 for isolating a cab 1 from the compartment for accommodating the motor 14. The first baffle 5 presents an inverted-凸 shape. Optionally, an acoustic material is attached to one face of the first baffle 5 facing the chamber.

The chamber in the present embodiment comprises a motor hood 2, and a second baffle 16 and a third baffle 17 provided on both sides of the motor. The motor hood 2, the first baffle 5, the second baffle 16 and the third baffle 17 form an enclosed chamber to reduce the noise propagating to the exterior of the compartment.

Optionally, an inner wall of the chamber is wholly or locally attached with an acoustic material. In the present embodiment, an acoustic material is attached to the second baffle 16 and the third baffle 17.

In the present embodiment, the first air inlet 9, the radiator 8, the fan 15, the motor 14, and the air outlet 3 are sequentially arranged along the longitudinal direction of the vehicle. The air introduced by the first air inlet 9 after exchanging heat with the radiator 8 passes through a gap between the motor 14 and the inner wall of the chamber to flow towards the air outlet 3. The air is movable along the longitudinal direction of the vehicle, so that the flow of air is smooth and thus the noise produced in the operational process of the vehicle is reduced. Further, the radiation efficiency of the radiator 8 is improved.

Figure 7:
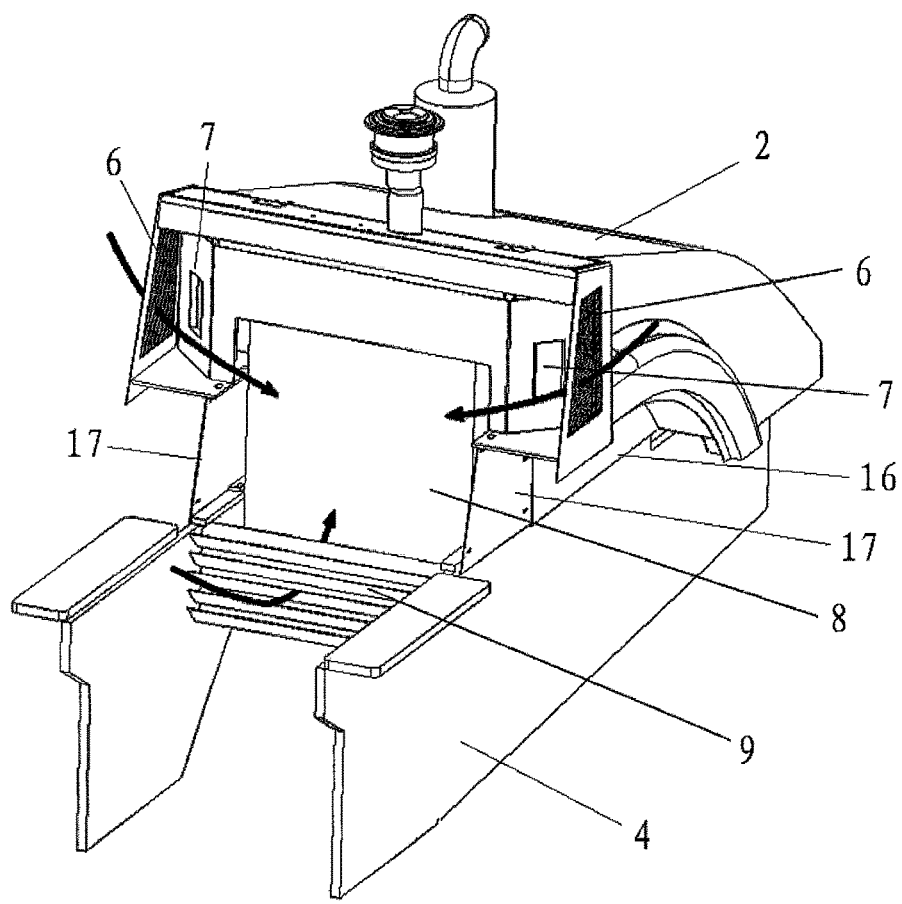
FIG. 7 shows a schematic view of the structure at the air inlet of the vehicle power cabin in the embodiments of the present disclosure.

FIG. 7 shows a schematic view of the structure at the air inlet of the vehicle power cabin in the present embodiment. As shown in FIG. 7, the first air inlet 9 is disposed at the bottom of the chamber. The bottom space of the frame 4 is adequately utilized, so that on the premise of not increasing a longitudinal dimension of the vehicle, there is a spacing between the first air inlet 9 and the radiator 8, so that the air can smoothly flow to the radiator 8, to reduce the probability of vortex in the air flow process.

The first muffler is disposed at the first air inlet 9, so as to reduce the noise radiated from the interior to the exterior of the chamber. Optionally, the first muffler comprises a silencing louver. The silencing louver comprises a plurality of blades arranged side by side. Alternatively, the blade is attached with an acoustic material layer for reducing the noise. The acoustic material layer has a thickness of 2 mm to 10 mm.

In the present embodiment, the cross section of the blade presents a V type, and the included angle of the V type is Alternatively 120° to 150°. The aforementioned acoustic material layer is attached to the inside of the blade.

As shown in FIG. 7, the air inlet further comprises a second air inlet 6 provided on a side of the compartment. The second air inlet 6 is located at an upper portion of the side wall of the chamber.

Figure 8:
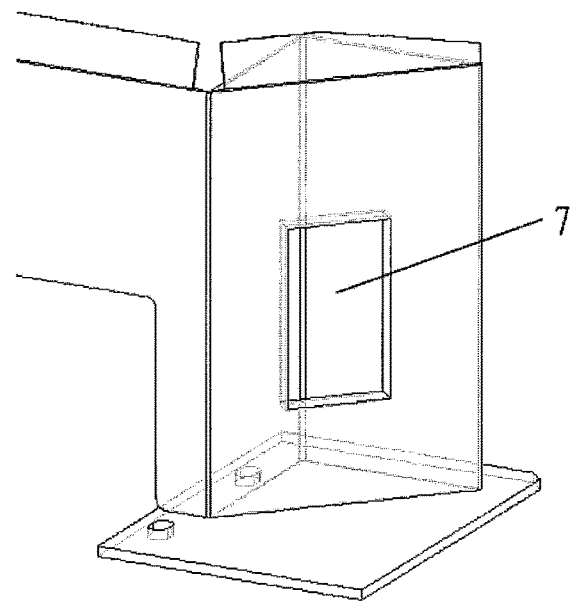
FIG. 8 shows a schematic view of the structure of the Helmholtz muffler of the vehicle power cabin in the embodiments of the present disclosure.

A second muffler is disposed at the second air inlet 6. Optionally, the second muffler comprises a Helmholtz resonator. FIG. 8 shows a schematic view of the structure of the Helmholtz resonator in the present embodiment. The Helmholtz resonator comprises a muffler cavity in the shape of a triangular prism.

Figure 9:
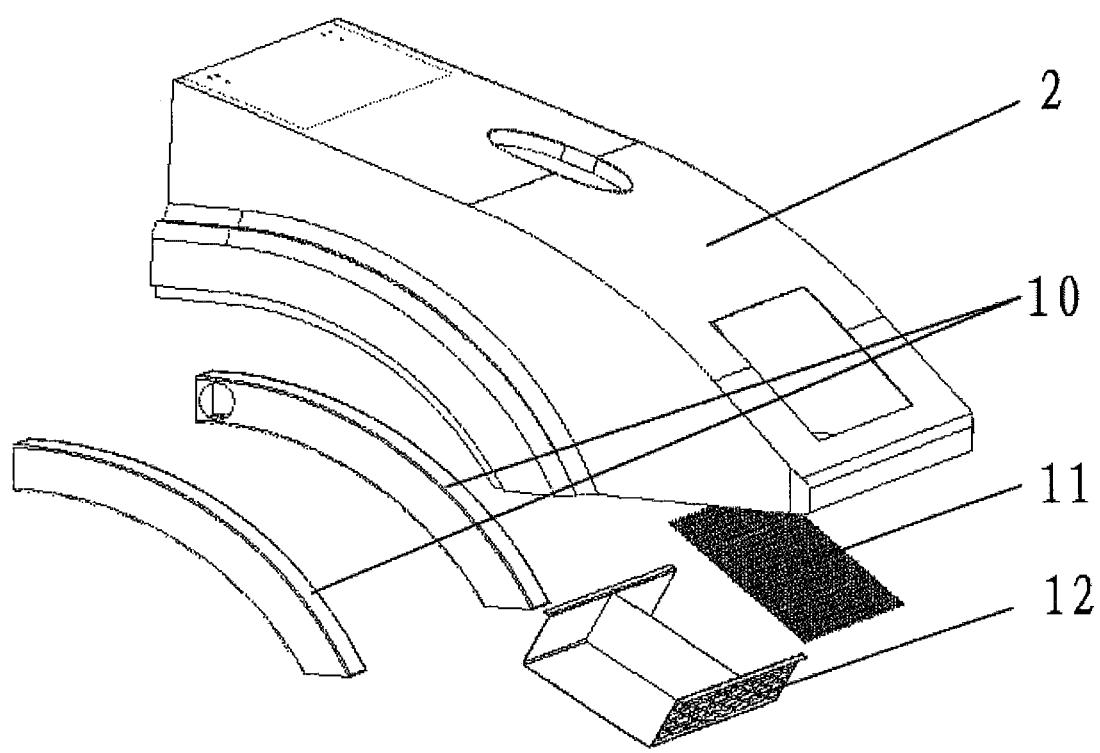
FIG. 9 shows an exploded view of the compartment of the vehicle power cabin in the embodiments of the present disclosure.

FIG. 9 shows an exploded view of the vehicle power cabin in the present embodiment. The vehicle power cabin further comprises a third muffler 10 provided within the chamber, for reducing noise of a particular frequency produced by air flowing from the air inlet to the air outlet 3.

The third muffler 10 comprises a quarter wave resonator. The quarter wave resonator presents an arc shape. The quarter wave resonator has a length of 0.5 meter to 1.5 meters. quarter wave resonator comprises a quarter-wavelength tube.

The inlet of the quarter wave resonator is disposed on one side of the fan 15 with its back facing the radiator 8.

There are two quarter wave resonator, which are respectively located at both sides of the motor 14. Optionally, the quarter wave resonator is mounted on the side wall of the chamber.

The vehicle power cabin further comprises a fourth muffler 12 provided at the air outlet 3, for reducing noise radiated to the exterior of the chamber through the air outlet 3.

Figure 10:
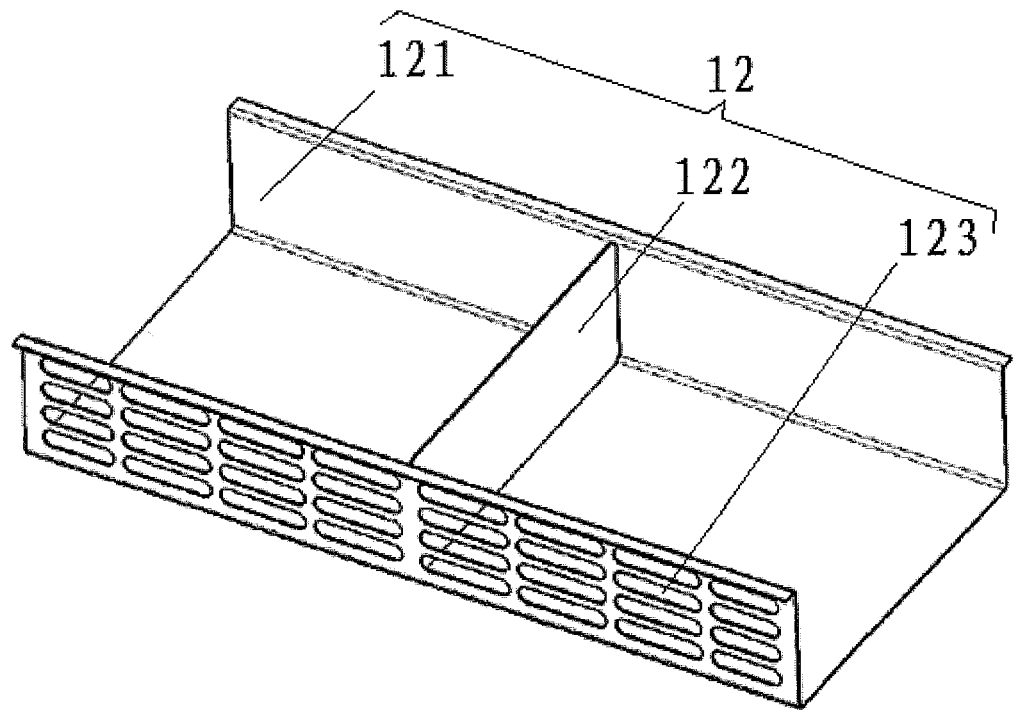
FIG. 10 shows a schematic view of the structure of the third muffler at the air outlet of the vehicle power cabin in the embodiments of the present disclosure.

FIG. 10 shows a schematic view of the structure of the fourth muffler 12 in the present embodiment. The fourth muffler 12 comprises a housing 121 and an acoustic material provided within the housing 121. Optionally, both the inside and outside of the housing 121 are provided with an acoustic material.

The housing 121 comprises two side walls that are oppositely provided and a partition 122 connected between the two side walls, for reinforcing the strength of the housing 121 and producing a guiding effect over the air flowing out of the vehicle power cabin.

One side wall of the housing 121 which faces downward, is provided with a plurality of holes 123. The housing 121 also comprises two openings respectively facing the two side walls of the chamber.

In the present embodiment, the air outlet 3 is further provided with a grille 11.

In combination with the illustration of FIG. 5, the vehicle power cabin further comprises a flow guiding member 13 for guiding the air after the heat exchange to the air outlet.

The flow guiding member 13, the motor hood 2 and the air outlet 3 form a U-shaped air outlet structure, to reduce the vortex produced during the air flow, and further reduce the air outlet resistance.

Figure 11:
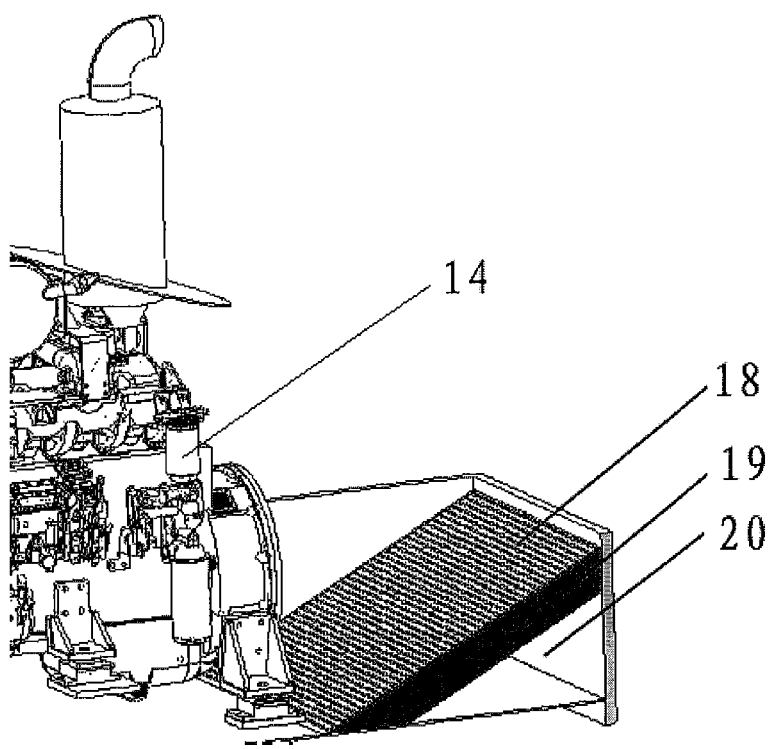
FIG. 11 shows a schematic view of the muffler cavity at the rear of the vehicle power cabin in the embodiments of the present disclosure.

As shown in FIG. 11, the flow guiding member 13 comprises a fifth muffler. The fifth muffler comprises a muffler cavity, which consists of the perforated plate 18, the acoustic material 19, the cavity 20 and the frame 4.

The vehicle power cabin further comprises a frame 4 for carrying the motor 14, and the fifth muffler comprises a muffler cavity. The muffler cavity comprises a cavity 20 enclosed by the frame 4 and a perforated plate 18 obliquely disposed at a corner of the frame 4, and an acoustic material 19 is provided at one side of the perforated plate 18 facing the cavity 20.

According to another aspect of the present application, the present embodiment further provides a construction vehicle, which has the aforementioned vehicle power cabin. The construction vehicle comprises a road roller.

The foregoing is intended only as a preferred embodiment of the present disclosure, but is not used for limiting the present disclosure, and for a person skilled in the art, the present disclosure may have various modifications and variations. Any amendment, equivalent replacement, improvement, and the like within the spirit and principles of the present disclosure should all be contained within the protection scope of the present disclosure.

The invention claimed is:

1. A vehicle power cabin, comprising:
a chamber;
a radiator mounted in said chamber;
a fan for driving air to flow through said radiator;
a motor for driving said fan; and
wherein said chamber comprises an air inlet for introducing air exchanging heat with said radiator and an air outlet for outputting air exchanged heat with said radiator; said air inlet comprises a first air inlet; said first air inlet, said radiator and said fan being sequentially arranged in a longitudinal direction of the vehicle, said first air inlet and said radiator being spacedly disposed in the longitudinal direction, said first air inlet is disposed at the bottom of said chamber,
said air inlet comprises a second air inlet provided on a side of said chamber,
the vehicle power cabin further comprising a second muffler mounted at said second air inlet.

2. The vehicle power cabin according to claim 1, wherein said air outlet and said first air inlet are arranged along said longitudinal direction.

3. The vehicle power cabin according to claim 1, further comprising a first muffler mounted at said first air inlet.

4. The vehicle power cabin according to claim 3, wherein said first muffler comprises a louver muffler.

5. The vehicle power cabin according to claim 1, wherein said second muffler comprises a Helmholtz resonator.

6. The vehicle power cabin according to claim 1, further comprising a third muffler mounted in said chamber, for reducing noise produced by air flowing from said first air inlet to the air outlet.

7. The vehicle power cabin according to claim 6, wherein said third muffler comprises a quarter-wave resonator.

8. The vehicle power cabin according to claim 1, further comprising a fourth muffler mounted at the air outlet.

9. The vehicle power cabin according to claim 8, wherein said fourth muffler comprises a housing on which an acoustic hole is provided and an acoustic material provided within the housing.

10. The vehicle power cabin according to claim 1, further comprising a flow guiding member for guiding the air exchanged heat with said radiator to said air outlet.

11. The vehicle power cabin according to claim 10, wherein said flow guiding member comprises a fifth muffler.

12. The vehicle power cabin according to claim 11, further comprising a frame for carrying the motor, said fifth muffler comprising a muffler cavity, said muffler cavity comprising a cavity enclosed by said frame and a perforated plate obliquely disposed at a corner of said frame, an acoustic material being provided at one side of the perforated plate facing said cavity.

13. The vehicle power cabin according to claim 1, further comprising a first baffle for isolating a cab from said chamber.

14. The vehicle power cabin according to claim 13, wherein an acoustic material is attached to one side of the first baffle facing said chamber.

15. The vehicle power cabin according to claim 1, wherein said chamber is enclosed.

16. The vehicle power cabin according to claim 1, wherein the inner wall of the chamber is wholly or locally provided with an acoustic material.

17. A construction vehicle, comprising said vehicle power cabin according to claim 1.

* * * * *

UNITED STATES PATENT AND TRADEMARK OFFICE
CERTIFICATE OF CORRECTION

PATENT NO. : 10,472,776 B2
APPLICATION NO. : 16/067280
DATED : November 12, 2019
INVENTOR(S) : Zhao et al.

Page 1 of 1

It is certified that error appears in the above-identified patent and that said Letters Patent is hereby corrected as shown below:

On the Title Page

Item (30) Foreign Application Priority Data:
Please correct "2017 1 0040165" to read -- 2017 1 0040165.5 --

Signed and Sealed this
Third Day of March, 2020

Andrei Iancu
*Director of the United States Patent and Trademark Office*